(12) United States Patent
Hisaminato et al.

(10) Patent No.: US 9,032,919 B2
(45) Date of Patent: May 19, 2015

(54) SPARK IGNITION TYPE INTERNAL COMBUSTION ENGINE

(75) Inventors: Naoto Hisaminato, Susono (JP); Eiichi Kamiyama, Mishima (JP); Manabu Tateno, Shizuoka (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 534 days.

(21) Appl. No.: 13/512,648

(22) PCT Filed: Dec. 4, 2009

(86) PCT No.: PCT/JP2009/070717
§ 371 (c)(1),
(2), (4) Date: May 30, 2012

(87) PCT Pub. No.: WO2011/067865
PCT Pub. Date: Jun. 9, 2011

(65) Prior Publication Data
US 2012/0234274 A1   Sep. 20, 2012

(51) Int. Cl.
*F02B 75/04* (2006.01)
*F02D 13/06* (2006.01)
(Continued)

(52) U.S. Cl.
CPC ............ *F02D 13/06* (2013.01); *F02D 13/0238* (2013.01); *F02D 13/0269* (2013.01);
(Continued)

(58) Field of Classification Search
CPC ......... F02D 15/00; F02D 15/04; F02D 17/02; F02D 41/0087; F02B 75/04; F02B 75/041; F01L 13/0005; F01L 2013/002; F01L 1/34

USPC ................ 123/48 R–48 D, 78 R–78 F, 198 F, 123/198 DB, 198 DC, 90.15–90.18
See application file for complete search history.

(56) References Cited

U.S. PATENT DOCUMENTS 4,428,192 A * 1/1984 Dinger et al. .................... 60/606
6,019,090 A * 2/2000 Ozawa .......................... 123/481
(Continued)

FOREIGN PATENT DOCUMENTS

| JP | 56-122735 | 9/1981 |
| JP | 62-85142  | 4/1987 |

(Continued)

OTHER PUBLICATIONS

International Search Report in International Application No. PCT/JP2009/070717; Mailing Date: Jan. 12, 2010.

*Primary Examiner* — Marguerite McMahon
(74) *Attorney, Agent, or Firm* — Finnegan, Henderson, Farabow, Garrett & Dunner, LLP

(57) ABSTRACT

A spark ignition type internal combustion engine includes a plurality of cylinders and can stop combustion in part of these cylinders. Further, the spark ignition type internal combustion engine comprises a variable compression ratio mechanism (A) which can change an mechanical compression ratio, and a variable valve timing mechanism (B) which can control a closing timing of an intake valve. When idling part of the cylinders or increasing idled cylinders, the closing timing of an intake valve (7) moves in a direction which approaches an intake bottom dead center side, and the mechanical compression ratio of the operating cylinders falls. By idling part of the plurality of cylinders in this way, it is possible to realize a high heat efficiency even in a region where the engine load is low.

9 Claims, 11 Drawing Sheets

(51) Int. Cl.
   F02D 13/02   (2006.01)
   F02D 15/04   (2006.01)
   F02D 17/02   (2006.01)
   F02D 41/00   (2006.01)

(52) U.S. Cl.
   CPC ............... F02D15/04 (2013.01); F02D 17/02 (2013.01); F02D 41/0002 (2013.01); F02D 41/0087 (2013.01); *Y02T 10/12* (2013.01); *Y02T 10/142* (2013.01); *Y02T 10/42* (2013.01); *F02D 13/023* (2013.01)

(56) References Cited

U.S. PATENT DOCUMENTS

| | | | |
|---|---|---|---|
| 7,917,279 B2 * | 3/2011 | Akihisa et al. | 701/103 |
| 8,316,809 B1 * | 11/2012 | Patterson et al. | 123/179.16 |
| 8,555,832 B2 * | 10/2013 | Akihisa et al. | 123/78 C |
| 2002/0189592 A1 | 12/2002 | Nishigaki | |
| 2005/0034701 A1 * | 2/2005 | Betz et al. | 123/198 F |
| 2008/0029057 A1 * | 2/2008 | Hergart et al. | 123/198 F |
| 2008/0255752 A1 * | 10/2008 | Sugihara | 701/103 |
| 2012/0048241 A1 * | 3/2012 | Okada | 123/48 C |

FOREIGN PATENT DOCUMENTS

| | | |
|---|---|---|
| JP | 2002-256950 | 9/2002 |
| JP | 2002-349304 | 12/2002 |
| JP | 2005-127216 | 5/2005 |
| JP | 2006-9601 | 1/2006 |
| JP | 2007-303423 | 11/2007 |
| JP | 2009-114963 | 5/2009 |
| JP | 2009-114965 | 5/2009 |
| WO | WO 2007/132613 A2 | 11/2007 |

* cited by examiner

Fig.5
(A)
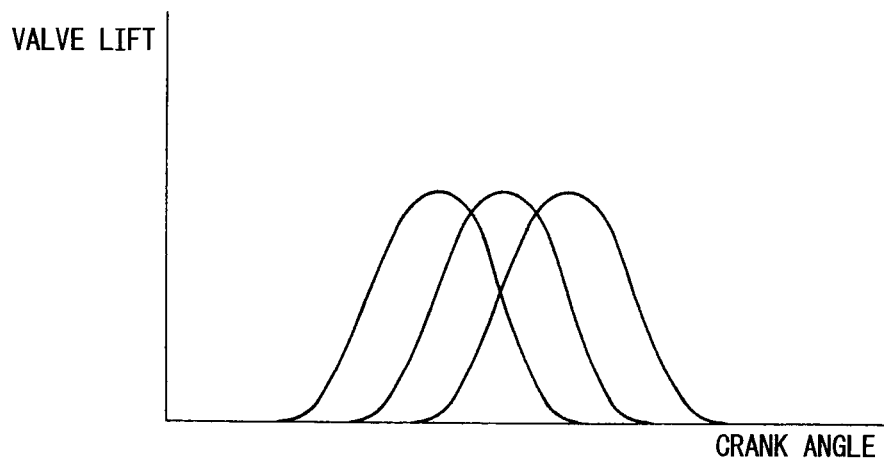
(B)
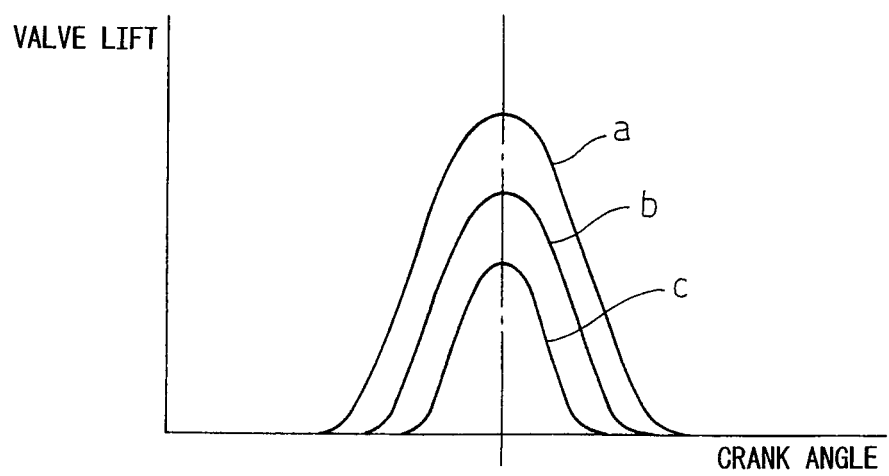

Fig. 6
(A)
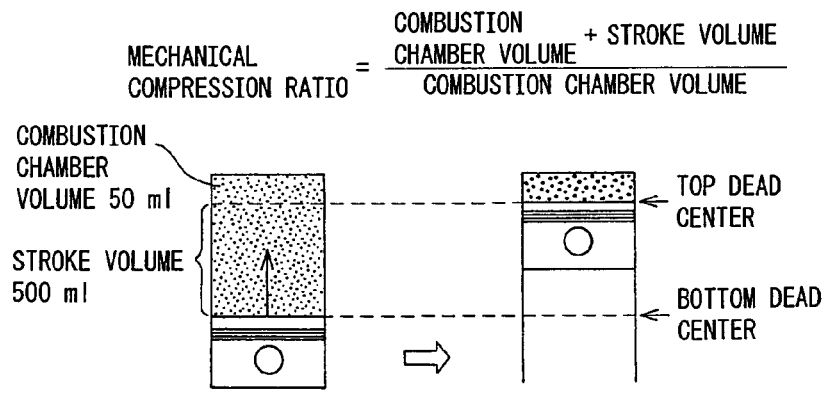
(B)
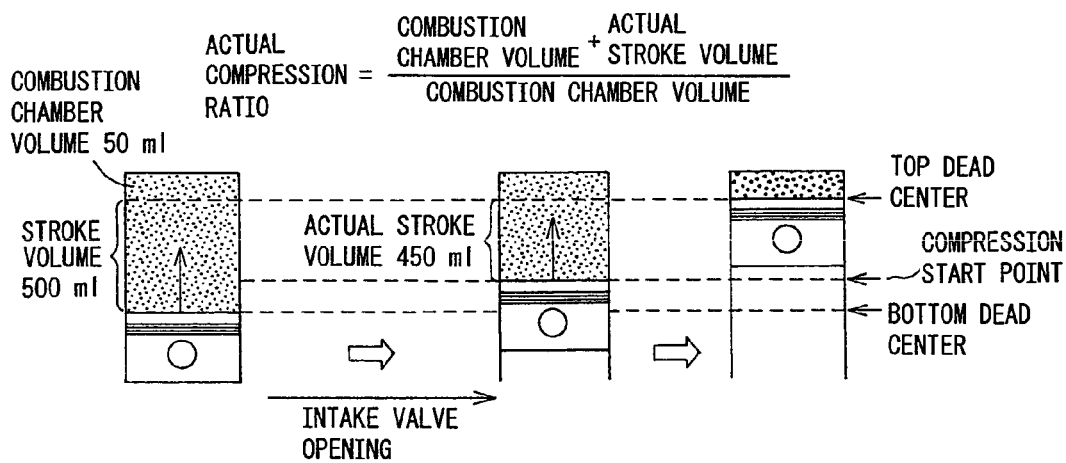
(C)
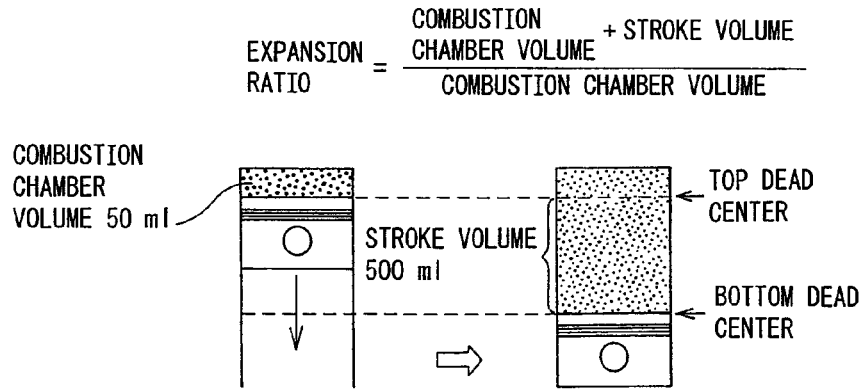

Fig. 8
(A) 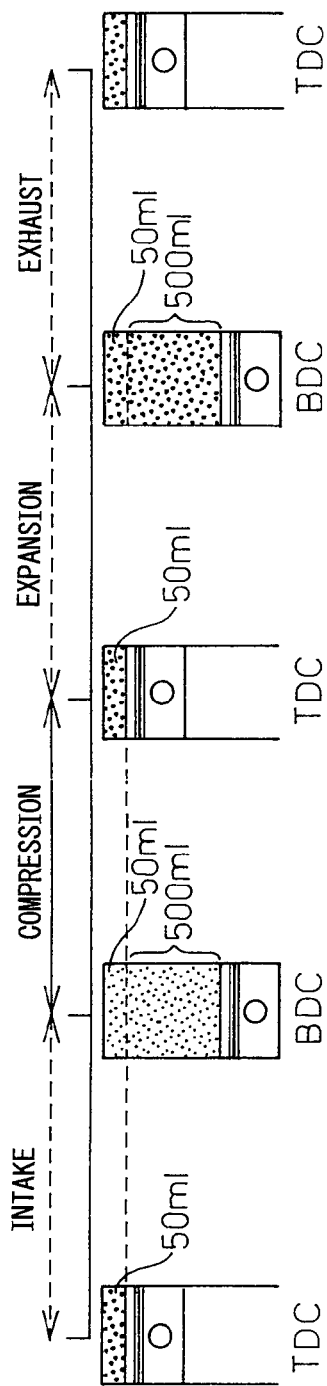
(B) 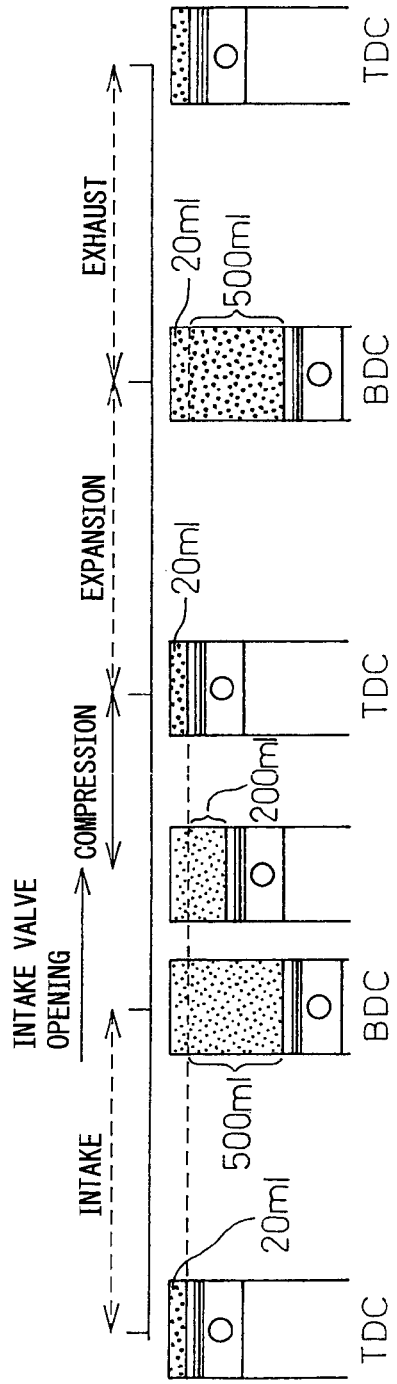

SPARK IGNITION TYPE INTERNAL COMBUSTION ENGINE

CROSS-REFERENCE TO RELATED APPLICATIONS

This application is a national phase application of International Application No. PCT/JP2009/070717, filed Dec. 4, 2009, the content of which is incorporated herein by reference.

TECHNICAL FIELD

The present invention relates to a spark ignition type internal combustion engine.

BACKGROUND ART

Known in the art is a spark ignition type internal combustion engine comprising a variable compression ratio mechanism which is able to change an mechanical compression ratio and a variable valve timing mechanism which is able to control a closing timing of an intake valve, wherein an amount of intake air which is supplied into a combustion chamber is mainly controlled by changing the closing timing of the intake valve and wherein at the time of engine low load operation, the mechanical compression ratio is higher than at the time of engine high load operation (for example, PLT 1).

In particular, compared to the actual compression ratio, the mechanical compression ratio (that is, the expansion ratio) has a larger effect on the theoretical heat efficiency. Therefore, in the spark ignition type internal combustion engine which is described in PLT 1, during engine low load operation, the actual compression ratio is maintained low while the mechanical compression ratio is a high value of, for example, 20 or more. Due to this, in the spark ignition type internal combustion engine which is described in PLT 1, it is possible to make the theoretical heat efficiency an extremely high value. Along with this, the fuel efficiency is greatly improved.

CITATIONS LIST

Patent Literature

PLT 1: Japanese Patent Publication (A) No. 2007-303423
PLT 2: Japanese Patent Publication (A) No. 62-085142
PLT 3: Japanese Utility Model Publication (A) No. 56-122735
PLT 4: Japanese Patent Publication (A) No. 2002-256950
PLT 5: Japanese Patent Publication (A) No. 2002-349304
PLT 6: Japanese Patent Publication (A) No. 2005-127216

SUMMARY OF INVENTION

Technical Problem

In this regard, in the spark ignition type internal combustion engine which is described in PLT 1, the lower the engine load, the more the mechanical compression ratio is increased. However, in a variable compression ratio mechanism, it is not possible to raise the mechanical compression ratio without limit. Due to the structure of the combustion chamber 5, it is not possible to raise the mechanical compression ratio over a certain fixed mechanical compression ratio (limit mechanical compression ratio). For this reason, in a spark ignition type internal combustion engine, in the region of a load lower than the engine load when the mechanical compression ratio reaches the limit mechanical compression ratio, the mechanical compression ratio is held at the limit mechanical compression ratio.

Further, in the spark ignition type internal combustion engine which is described in PLT 1, the amount of intake air which is supplied into a combustion chamber is mainly controlled by changing the closing timing of the intake valve. Therefore, the lower the engine load, the more the closing timing of the intake valve is retarded in a direction away from intake bottom dead center. However, if the engine load becomes low and the amount of intake air which should be supplied into the combustion chamber is reduced, it no longer becomes possible to control the amount of intake air which is supplied into the combustion chamber by the closing timing of the intake valve. For this reason, in the region of a load lower than the engine load when the closing timing of the intake valve reaches the limit closing timing where the amount of intake air which is supplied into the combustion chamber can be controlled by the closing timing, the amount of intake air which is supplied into the combustion chamber is controlled by the throttle valve.

In this way, in the region where the engine load is low, the mechanical compression ratio is held at the limit mechanical compression ratio and the amount of intake air which is supplied into a combustion chamber is controlled by the throttle valve. For this reason, in this region, it is not possible to sufficiently raise the heat efficiency.

Therefore, in consideration of this problem, the present invention provides a spark ignition type internal combustion engine which can realize a high heat efficiency even in a region where the engine load is low.

Solution to Problem

The present invention, as means for solving the above problem, provides an internal combustion engine as set forth in the claims.

In a first aspect of the present invention, there is provided a spark ignition type internal combustion engine including a plurality of cylinders and being able to stop combustion in part of these cylinders, wherein the engine comprises a variable compression ratio mechanism which can change an mechanical compression ratio and a variable valve timing mechanism which can control a closing timing of an intake valve, wherein when idling part of the cylinders or increasing idled cylinders, the closing timing of the intake valve moves in a direction which approaches an intake bottom dead center side, and the mechanical compression ratio of the operating cylinders falls.

In a second aspect of the present invention, there is provided a spark ignition type internal combustion engine, wherein when idling the part of the cylinders or increasing idled cylinders, an opening degree of a throttle valve is increased.

In a third aspect of the present invention, there is provided a spark ignition type internal combustion engine, wherein when idling the part of the cylinders or increasing idled cylinders, an actual compression ratio of the operating cylinders becomes larger.

In a fourth aspect of the present invention, there is provided a spark ignition type internal combustion engine, wherein when idling the part of the cylinders or increasing idled cylinders, an operation by the variable compression ratio mechanism to reduce an mechanical compression ratio of the operating cylinders is started, then a shift by the variable valve timing mechanism of the closing timing of the intake valve is started.

In a fifth aspect of the present invention, there is provided a spark ignition type internal combustion engine wherein said spark ignition type internal combustion engine performs reduced cylinder operation which idles part of the cylinders when the engine load is lower than a switching load and performs full cylinder operation which operates all cylinders when the engine load is the switching load or more, and wherein when the engine load is lower than the switching load, as the engine load falls toward a predetermined load which is lower than the switching load, the mechanical compression ratio is increased and the actual compression ratio is held constant.

In a sixth aspect of the present invention, there is provided a spark ignition type internal combustion engine wherein the predetermined load is an engine load when the mechanical compression ratio is increased along with a drop in the engine load from the switching load and as a result the mechanical compression ratio reaches a maximum mechanical compression ratio.

In a seventh aspect of the present invention, there is provided a spark ignition type internal combustion engine wherein the switching load is a load of half or less of the maximum engine load.

In a eighth aspect of the present invention, there is provided a spark ignition type internal combustion engine wherein the switching load is not more than the load where a heat efficiency becomes maximum when performing full cylinder operation and not less than a load where the heat efficiency becomes maximum when performing reduced cylinder operation.

In a ninth aspect of the present invention, there is provided a spark ignition type internal combustion engine wherein the switching load is a load when the heat efficiency when performing reduced cylinder operation and the heat efficiency when performing full cylinder operation become equal.

Below, the present invention can be understood much more from the attached drawings and the description of the preferred embodiments.

BRIEF DESCRIPTION OF DRAWINGS

FIG. 5 is a view showing the amounts of lift of an intake valve and an exhaust valve.

FIG. 6 is a view for explaining a mechanical compression ratio, actual compression ratio, and expansion ratio.

FIG. 8 is a view for explaining an ordinary cycle and superhigh expansion ratio cycle.

DESCRIPTION OF EMBODIMENTS

Figure 1:
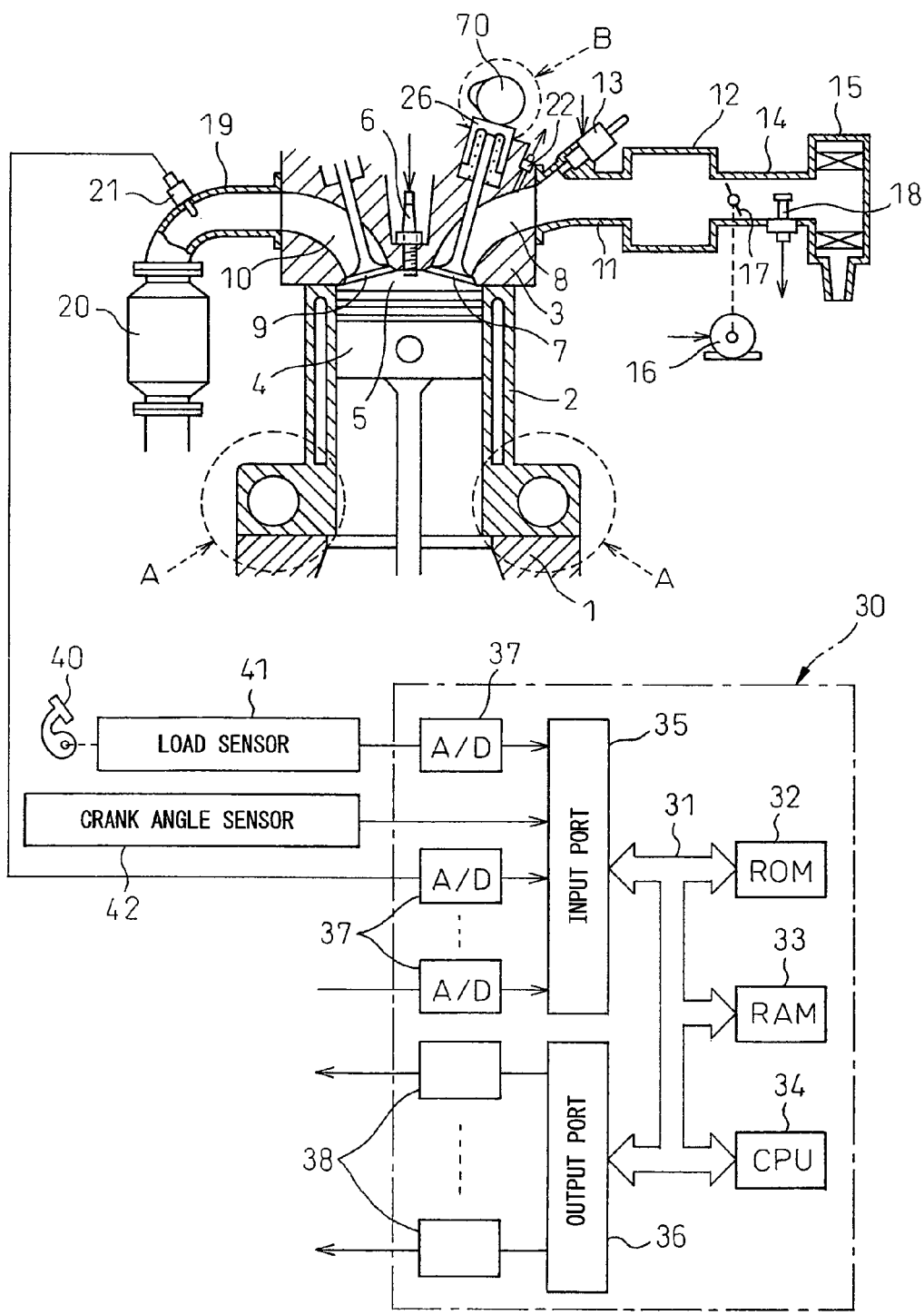
FIG. 1 is an overall view of a spark ignition type internal combustion engine.

Below, an embodiment of the present invention will be explained in detail with reference to the drawings. Note that, in the following explanation, similar component elements are assigned the same reference numerals.

FIG. 1 is side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the center of a top surface of the combustion chamber 5, 7 an intake valve, 8 an intake port, 9 an exhaust valve, and 10 an exhaust port. The intake ports 8 are connected through intake branch pipes 11 to a surge tank 12. The intake branch pipes 11 have fuel injectors 13 arranged in them for injecting fuel toward corresponding intake ports 8. Note that, the fuel injectors 13 may also be arranged inside the combustion chambers 5 instead of being attached to the intake branch pipes 11.

The surge tank 12 is connected through an intake duct 14 to an air cleaner 15. In the intake duct 14, a throttle valve 17 driven by an actuator 16 and an intake air detector 18 using for example a hot wire are arranged. On the other hand, the exhaust port 10 is connected through an exhaust manifold 19 to a catalytic converter 20 in which for example a three-way catalyst is built in. Inside the exhaust manifold 19, an air-fuel ratio sensor 21 is arranged.

On the other hand, in the embodiment shown in FIG. 1, at a connecting part of the crank case 1 and cylinder block 2, a variable compression ratio mechanism A is provided which can change a relative position of the crank case 1 and cylinder block 2 in the cylinder axial direction so as to change the volume of a combustion chamber 5 when a piston 4 is positioned at compression top dead center. Furthermore, a variable valve timing mechanism B is provided which can change a closing timing of an intake valve 7.

An electronic control unit 30 is comprised of a digital computer which is provided with components connected with each other by a bidirectional bus 31 such as a ROM (read only memory) 32, RAM (random access memory) 33, CPU (microprocessor) 34, input port 35, and output port 36. An output signal of the intake air detector 18 and an output signal of the air-fuel ratio sensor 21 are input through respectively corresponding AD converters 37 to the input port 35. Further, an accelerator pedal 40 is connected to a load sensor 41 which generates an output voltage proportional to the amount of depression of the accelerator pedal 40. The output voltage of the load sensor 41 is input through a corresponding AD converter 37 to the input port 35. Furthermore, a crank angle sensor 42 which generates an output pulse every time the crankshaft rotates by for example 10° is connected to the input port 35. On the other hand, the output port 36 is connected through corresponding drive circuits 38 to the spark plugs 6, fuel injectors 13, actuator 19 for driving the throttle valve, variable compression ratio mechanism A, and variable valve timing mechanism B.

The internal combustion engine of the present embodiment is an inline four-cylinder engine, which can be switched between a full cylinder operation where all of four cylinders are operated, and a reduced cylinder operation where two of four cylinders are operated and remaining two cylinders are idled. In the present embodiment, the fuel injectors 13 do not inject fuel in the two idling cylinders during the reduced cylinder operation, and therefore no combustion occurs in the combustion chambers 5 thereof. However, in the idling cylinders, the intake and exhaust valves 7 and 9 is alternatively opened and closed similarly to the other two operating cylinders. Therefore, in the present embodiment, although the opening and closing of the intake valve 7 are performed at a similar timing in all of the cylinders, the fuel injection from the fuel injectors 13 is performed only in the operating cylinders.

Note that although in the present embodiment, an inline four-cylinder engine is used as an internal combustion engine, any internal combustion engine, such as an inline six-cylinder engine or V-type eight-cylinder engine, can be used as long as the engine includes a plurality of cylinders. Further, in the present embodiment, the combustion in two cylinders is halted in the reduced cylinder operation. However, the combustion may be halted in any numbers of cylinders as long as the combustion is stopped only in a part of cylinders.

Moreover, in the present embodiment, the opening and closing of the intake and exhaust valves 7 and 9 are performed in the idling cylinders similarly to the operating cylinders. However, in the idling cylinders, the action of the intake and exhaust valves 7 and 9 may be halted in addition to the halting of the combustion, so that the intake and exhaust valves 7 and 9 are maintained closed. As methods for maintaining the intake valve 7, etc., closed, it can be considered to use electromagnetic drive valves, in which the opening and closing can be freely controlled, as the variable valve timing mechanism B to prevent the intake valve 7 of the idling cylinder from opening, or to use a V-type internal combustion engine as an engine to halt the camshaft of one bank at the position where the intake valve 7 is closed in all cylinders of one bank during the reduced cylinder operation.

Figure 2:
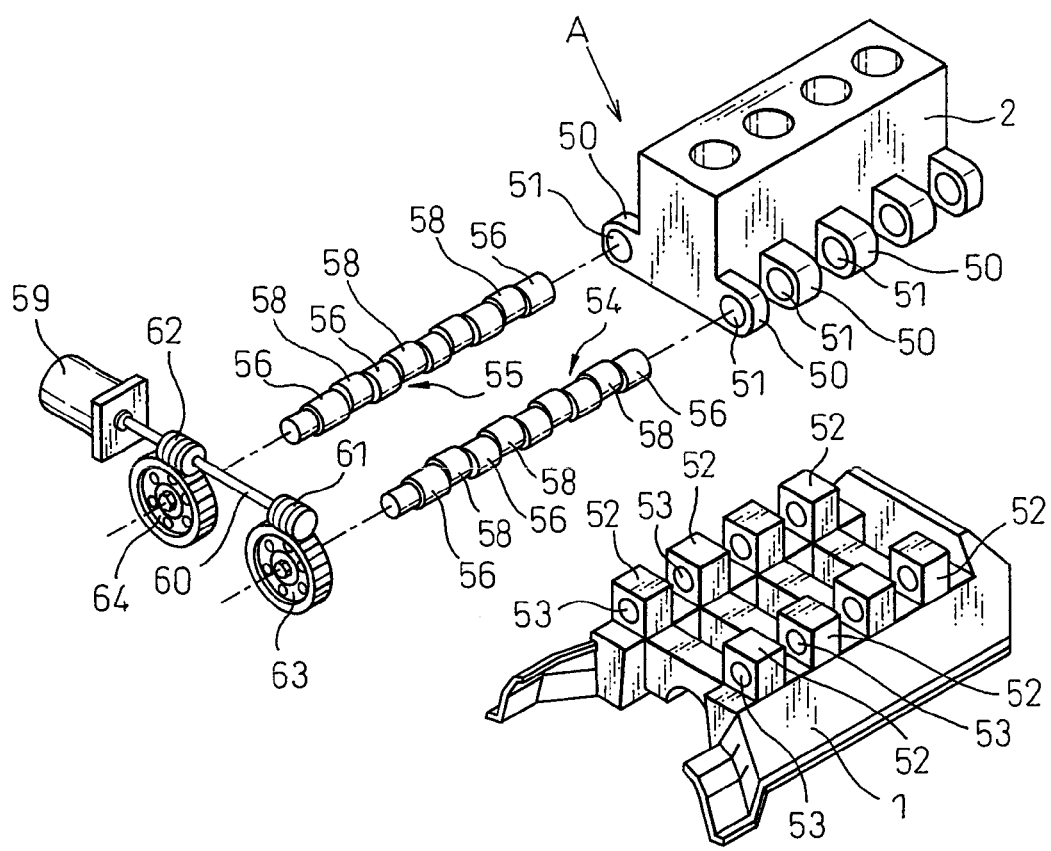
FIG. 2 is a exploded perspective view of a variable compression ratio mechanism.
Figure 3:
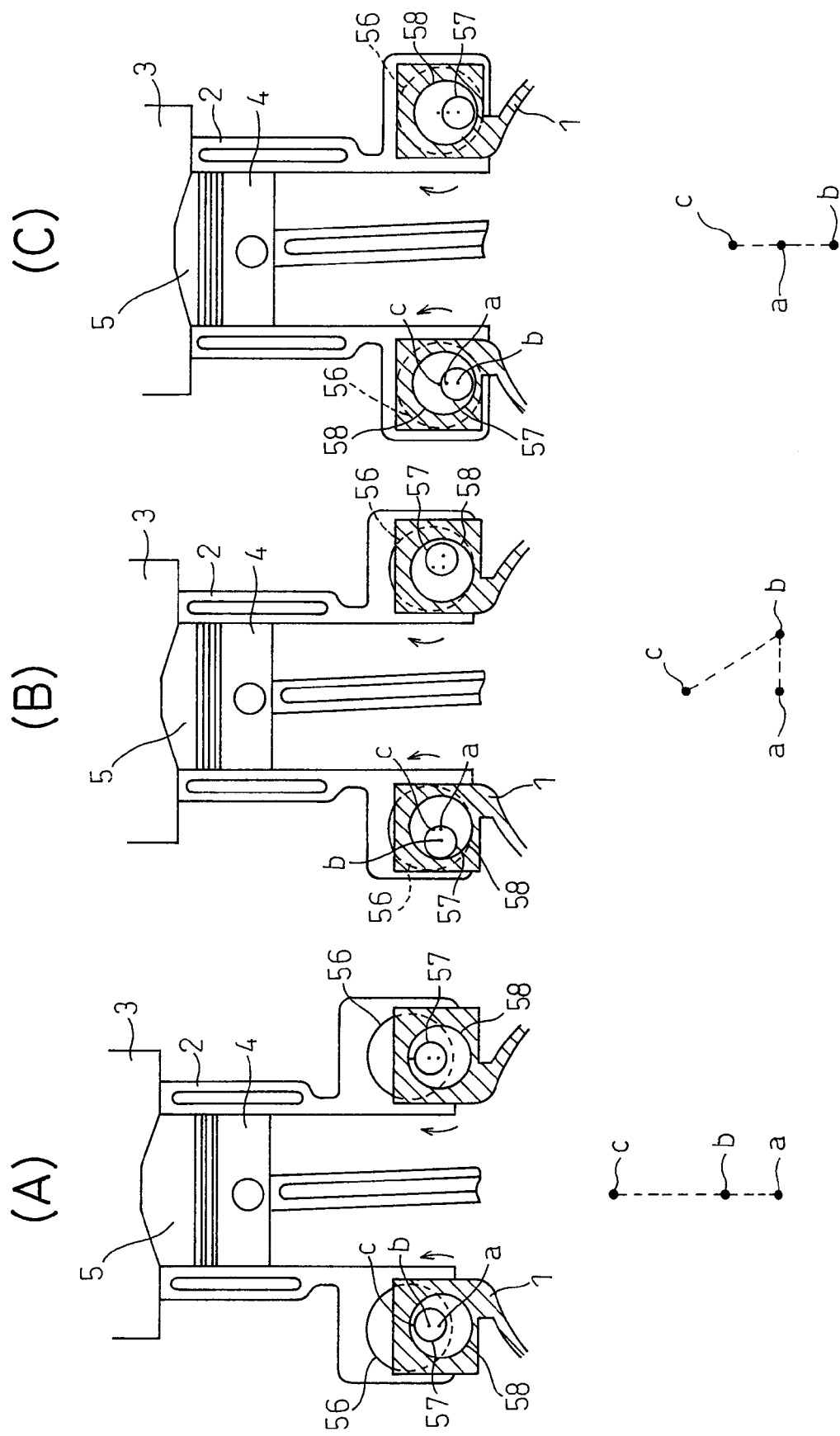
FIG. 3 is a side cross-sectional view of a schematically illustrated internal combustion engine.

FIG. 2 is a exploded perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a cam insertion hole 51 having a circular cross-section. On the other hand, the top surface of the crank case 1 is formed with a plurality of projecting parts 52 separated from each other by a certain distance and fitting between the corresponding projecting parts 50. These projecting parts 52 are also formed with cam insertion holes 53 having circular cross-sections.

As shown in FIG. 2, a pair of cam shafts 54, 55 is provided. Each of the cam shafts 54, 55 has circular cams 58 fixed on it able to be rotatably inserted in the cam insertion holes 51 at every other position. These circular cams 58 are coaxial with the axes of rotation of the cam shafts 54, 55. On the other hand, eccentric shafts 57 extend between the circular cams 58, and are arranged eccentrically with respect to the axes of rotation of the cam shafts 54, 55 as shown in FIG. 3. Each eccentric shaft 57 has other circular cams 56 rotatably attached to it eccentrically. As shown in FIG. 2, these circular cams 56 are arranged on both sides of the circular cams 58. These circular cams 56 are rotatably inserted in the corresponding cam insertion holes 51.

When the circular cams 58 fastened to the cam shafts 54, 55 are rotated in opposite directions from each other as shown by the arrows in FIG. 3(A) from the state shown in FIG. 3(A), the eccentric shafts 57 move toward the direction away from each other. Therefore, the circular cams 58 rotate in the opposite directions from the circular cams 56 in the cam insertion holes 51, as a result the level of the eccentric shafts 57 are changed from the higher position to the middle position as shown in FIG. 3(B). When the circular cams 58 are further rotated in the directions shown by the arrows, the level of the eccentric shafts 57 are changed to the lower position.

Note that FIGS. 3(A), 3(B) and 3(C) show the relationships between the centers a of the circular cams 58, centers b of the eccentric shafts 57 and the centers c of the circular cams 56 at the respective states.

As will be understood from a comparison of FIG. 3(A) to FIG. 3(C), the relative positions of the crank case 1 and cylinder block 2 are determined by the distance between the centers a of the circular cams 58 and the centers c of the circular cams 56. The larger the distance between the centers a of the circular cams 58 and the centers c of the circular cams 56, the farther the cylinder block 2 from the crank case 1. That is, the variable compression ratio mechanism A changes the relative positions of the crank case 1 and cylinder block 2 by the crank mechanism using rotatable cams. If the cylinder block 2 moves farther away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55, respectively. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
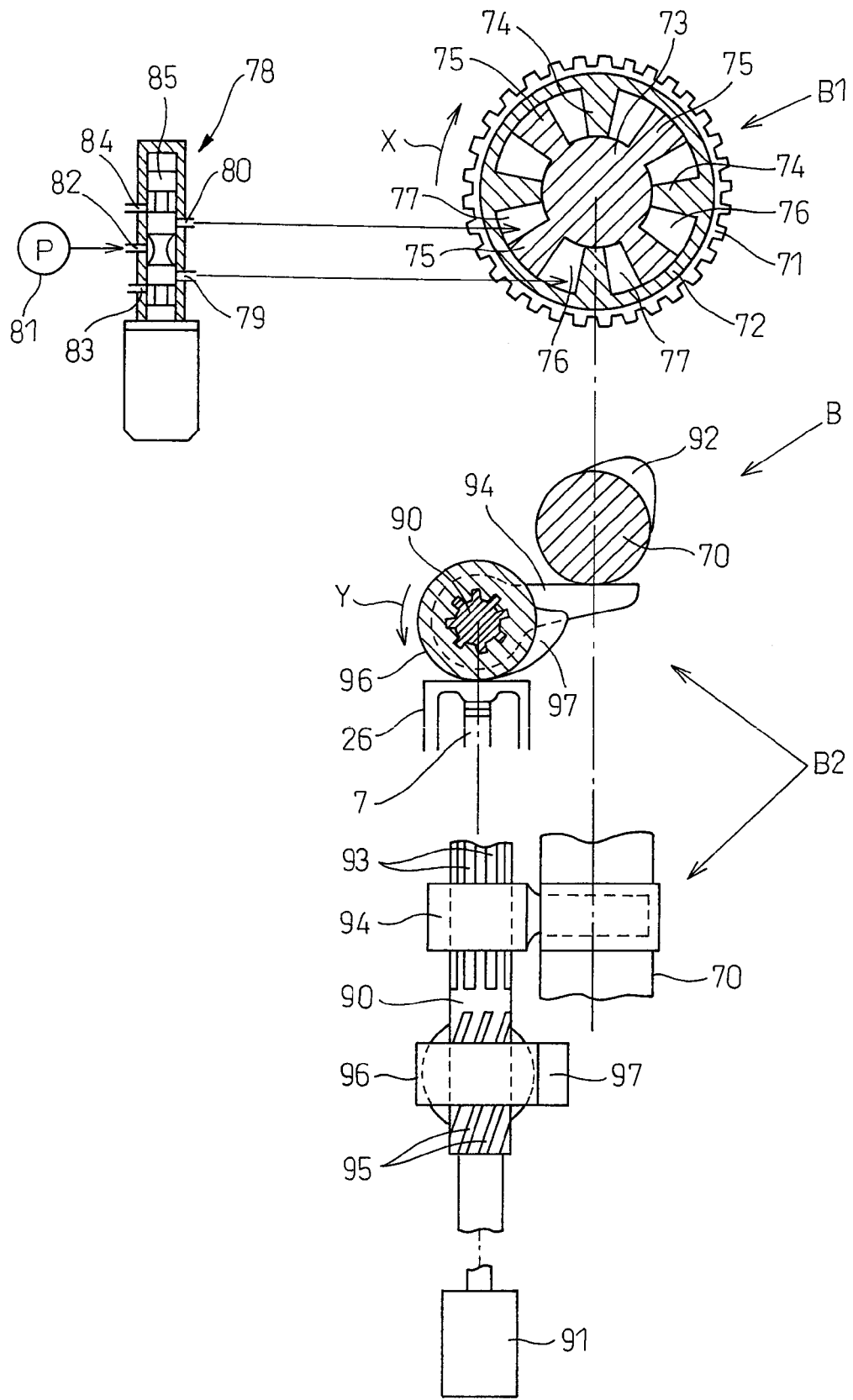
FIG. 4 is a view showing a variable valve timing mechanism.

On the other hand, FIG. 4 shows a variable valve timing mechanism B attached to the cam shaft 70 for driving the intake valve 7 in FIG. 1. As shown in FIG. 4, the variable valve timing mechanism B is comprised of a cam phase changer B1 attached to one end of the cam shaft 70 and changing the phase of the cam of the cam shaft 70 and a cam working angle changer B2 arranged between the cam shaft 70 and the valve lifter 26 of the intake valve 7 and changing the working angle of the cams of the cam shaft 70 to different working angles for transmission to the intake valve 7. Note that FIG. 4 includes a side sectional view and plan view of the cam working angle changer B2.

First, explaining the cam phase changer B1 of the variable valve timing mechanism B, this cam phase changer B1 is provided with a timing pulley 71 made to rotate by an engine crank shaft through a timing belt in the arrow direction, a cylindrical housing 72 rotating together with the timing pulley 71, a shaft 73 able to rotate together with a cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with advancing hydraulic chambers 76 and retarding hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, 84.

To advance the phase of the cams of the cam shaft 70, in FIG. 4, the spool valve 85 is moved to downward, working oil fed from the feed port 82 is fed through the hydraulic port 79 to the advancing hydraulic chambers 76, and working oil in the retarding hydraulic chambers 77 is drained from the drain port 84. At this time, the shaft 73 rotates relative to the cylindrical housing 72 in the arrow X-direction.

As opposed to this, to retard the phase of the cam of the cam shaft 70, in FIG. 4, the spool valve 85 is moved upward, working oil fed from the feed port 82 is fed through the hydraulic port 80 to the retarding hydraulic chambers 77, and working oil in the advancing hydraulic chambers 76 is drained from the drain port 83. At this time, the shaft 73 rotates relative to the cylindrical housing 72 in the direction opposite to the arrows X.

When the shaft 73 rotates relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the cam phase changer B1 so as to advance or retard the phase of the cam of the cam shaft 70 by exactly the desired amount as shown in FIG. 5(A) That is, the cam phase changer B1 can freely advance or retard the opening timing of the intake valve 7.

Next, explaining the cam working angle changer B2 of the variable valve timing mechanism B, this cam working angle changer B2 is provided with a control rod 90 arranged in parallel with the cam shaft 70 and made to move by an actuator 91 in the axial direction, an intermediate cam 94 engaging with a cam 92 of the cam shaft 70 and slidingly fitting with a spline 93 formed on the control rod 90 and extending in the axial direction, and a pivoting cam 96 engaging with a valve lifter 26 for driving the intake valve 7 and slidingly fitting with a spline 95 extending in a spiral formed on the control rod 90. The pivoting cam 96 is formed with a cam 97.

When the cam shaft 70 rotates, the cam 92 causes the intermediate cam 94 to pivot by exactly a constant angle at all times. At this time, the pivoting cam 96 also pivots by exactly a constant angle. On the other hand, the intermediate cam 94 and pivoting cam 96 are supported not movably in the axial direction of the control rod 90, therefore when the control rod 90 is made to move by the actuator 91 in the axial direction, the pivoting cam 96 rotates relative to the intermediate cam 94.

In the case where the cam 97 of the pivoting cam 96 starts to engage with the valve lifter 26 when the cam 92 of the cam shaft 70 starts to engage with the intermediate cam 94 due to the relative rotational positional relationship between the intermediate cam 94 and pivoting cam 96, as shown by a in FIG. 5(B), the opening time period and amount of lift of the intake valve 7 become maximum. As opposed to this, when the pivoting cam 96 is rotated relative to the intermediate cam 94 in the arrow Y-direction of FIG. 4 by the actuator 91, the cam 92 of the cam shaft 70 engages with the intermediate cam 94, then after a while the cam 97 of the pivoting cam 96 engages with the valve lifter 26. In this case, as shown by b in FIG. 5(B), the opening time period and amount of lift of the intake valve 7 become smaller than a.

When the pivoting cam 96 rotates relative to the intermediate cam 94 in the arrow Y-direction of FIG. 4, as shown by c in FIG. 5(B), the opening time period and amount of lift of the intake valve 7 become further smaller. That is, by using the actuator 91 to change the relative rotational position of the intermediate cam 94 and pivoting cam 96, the opening time period (working angle) of the intake valve 7 can be freely changed. However, in this case, the shorter the opening time period of the intake valve 7, the smaller the amount of the lift of the intake valve 7 becomes.

The opening timing of the intake valve 7 can be freely changed by the cam phase changer B1, and the opening time period of the intake valve 7 can be freely changed by the cam working angle changer B2 in this way. Therefore, the opening timing and opening time period of the intake valve 7, that is, the opening timing and closing timing of the intake valve 7 can be freely changed by both the cam phase changer B1 and cam working angle changer B2, that is, the variable valve timing mechanism B.

Note that the variable valve timing mechanism B shown in FIG. 1 and FIG. 4 show an example. It is also possible to use various types of variable valve timing mechanisms other than the example shown in FIG. 1 and FIG. 4. In particular, in this embodiment according to the present invention, so long as a closing timing mechanism which can change the closing timing of an intake valve 7, any type of mechanism may be used. Further, for the exhaust valves 9 as well, a variable valve timing mechanism similar to the variable valve timing mechanism B of the intake valve 7 may be provided.

Next, the meaning of the terms used in the present application will be explained with reference to FIG. 6. Note that FIG. 6(A) to FIG. 6(C) show for explanatory purposes an engine with a volume of the combustion chambers of 50 ml and a stroke volume of the piston of 500 ml. In these FIGS. 6(A), 6(B) and 6(C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston at the time of a compression stroke and combustion chamber volume. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+ actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as above, using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, a superhigh expansion ratio cycle used in the present invention will be explained with reference to FIG. 7, FIG. 8. Note that FIG. 7 shows the relationship between the theoretical heat efficiency and the expansion ratio, while FIG. 8 shows a comparison between the ordinary cycle and superhigh expansion ratio cycle used selectively in accordance with the load in the present invention.

FIG. 8(A) shows the ordinary cycle wherein the intake valve closes near the bottom dead center and the compression action by the piston is started from near substantially compression bottom dead center. In the example shown in this FIG. 8(A) as well, in the same way as the examples shown in FIGS. 6(A), 6(B) and 6C, the combustion chamber volume is 50 ml, and the stroke volume of the piston is 500 ml. As will be understood from FIG. 8(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
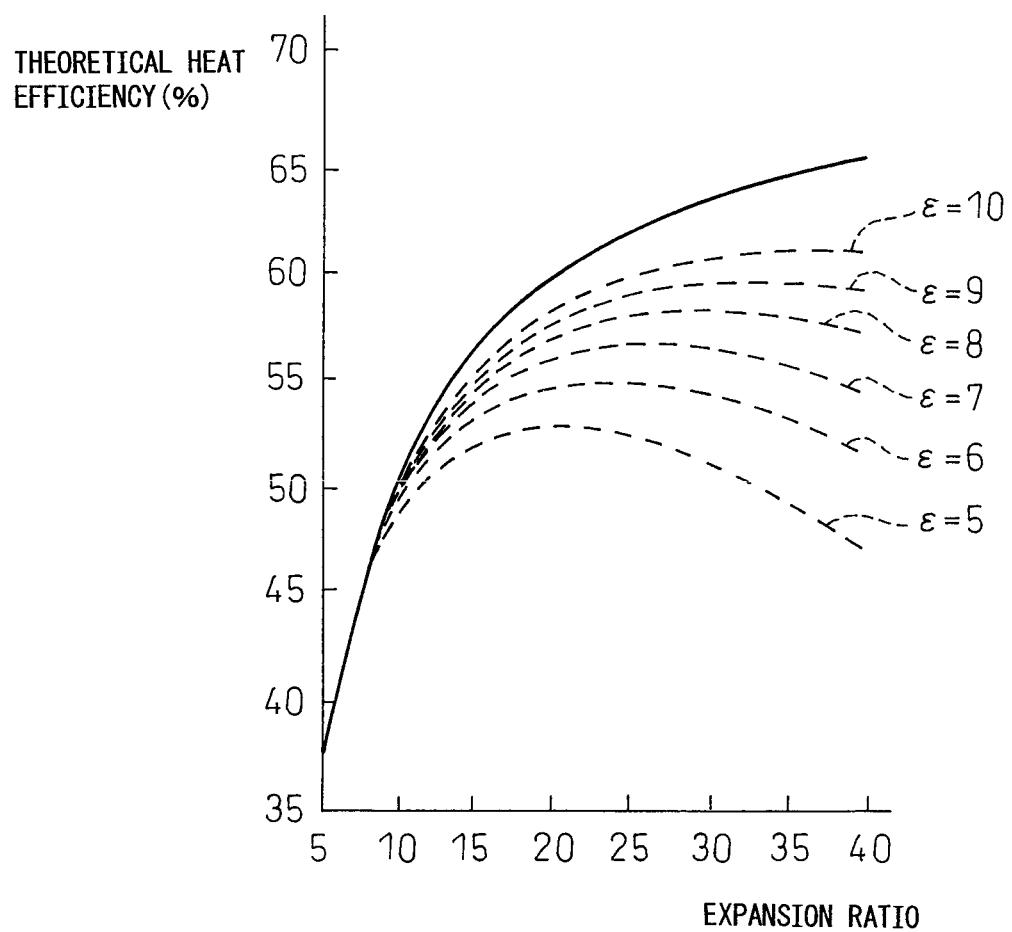
FIG. 7 is a view showing the relationship between a theoretical heat efficiency and the expansion ratio.

The solid line in FIG. 7 shows the change in the theoretical heat efficiency in the case where the actual compression ratio and expansion ratio are substantially equal, that is, in the ordinary cycle. In this case, it is learned that the larger the expansion ratio, that is, the higher the actual compression ratio, the higher the theoretical heat efficiency. Therefore, in an ordinary cycle, to raise the theoretical heat efficiency, the actual compression ratio should be higher. However, due to the restrictions on the occurrence of knocking at the time of engine high load operation, the actual compression ratio can only be raised even at the maximum to about 12, accordingly, in an ordinary cycle, the theoretical heat efficiency cannot be sufficiently high.

On the other hand, under this situation, the inventors strictly differentiated between the mechanical compression ratio and actual compression ratio and studied the theoretical heat efficiency and as a result discovered that in the theoretical heat efficiency, the expansion ratio is dominant, and the theoretical heat efficiency is not affected much at all by the actual compression ratio. That is, if raising the actual compression ratio, the explosive force rises, but compression requires a large energy, accordingly even if raising the actual compression ratio, the theoretical heat efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is, the higher the theoretical heat efficiency becomes. The broken line of $\epsilon=10$ in FIG. 7 shows the theoretical heat efficiency in the case of fixing the actual compression ratio at 10 and raising the expansion ratio in that state. It is learned that the amount of rise of the theoretical heat efficiency when raising the expansion ratio in the state where the actual compression ratio is maintained at a low value in this way, and the amount of rise of the theoretical heat efficiency in the case where the actual compression ratio is increased along with the expansion ratio as shown by the solid line of FIG. 7 will not differ that much.

If the actual compression ratio is maintained at a low value in this way, knocking will not occur. Therefore, if raising the expansion ratio in the state where the actual compression ratio is maintained at a low value, the occurrence of knocking can be prevented and the theoretical heat efficiency can be greatly raised. FIG. 8(B) shows an example of the case when using the variable compression ratio mechanism A and variable valve timing mechanism B to maintain the actual compression ratio at a low value and raise the expansion ratio.

Referring to FIG. 8(B), in this example, the combustion chamber volume is lowered from 50 ml to 20 ml by the variable compression ratio mechanism A. On the other hand, the closing timing of the intake valve is retarded by the variable valve timing mechanism B until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8(A), as explained above, the actual compression ratio is about 11 and the expansion ratio is 11. Compared with this case, in the case shown in FIG. 8(B), it is learned that only the expansion ratio is raised to 26. Accordingly, the cycle shown in FIG. 8(B) will be called the "superhigh expansion ratio cycle" below.

As explained above, generally speaking, in an internal combustion engine, the lower the engine load, the worse the heat efficiency. Therefore, to improve the heat efficiency at the time of vehicle traveling, that is, to improve the fuel efficiency, it becomes necessary to improve the heat efficiency at the time of engine low load operation. On the other hand, in the superhigh expansion ratio cycle shown in FIG. 8(B), the actual stroke volume of the piston at the time of the compression stroke is smaller, and therefore the amount of intake air which can be sucked into the combustion chamber 5 becomes smaller, therefore this superhigh expansion ratio cycle can only be employed when the engine load is relatively low. Therefore, in the present invention, at the time of engine low load operation, the engine is operated by the superhigh expansion ratio cycle shown in FIG. 8(B), while at the time of engine high load operation, it is operated by the ordinary cycle shown in FIG. 8(A).

Next, while referring to FIG. 9 and FIG. 10, the overall operational control will be explained.

Figure 9:
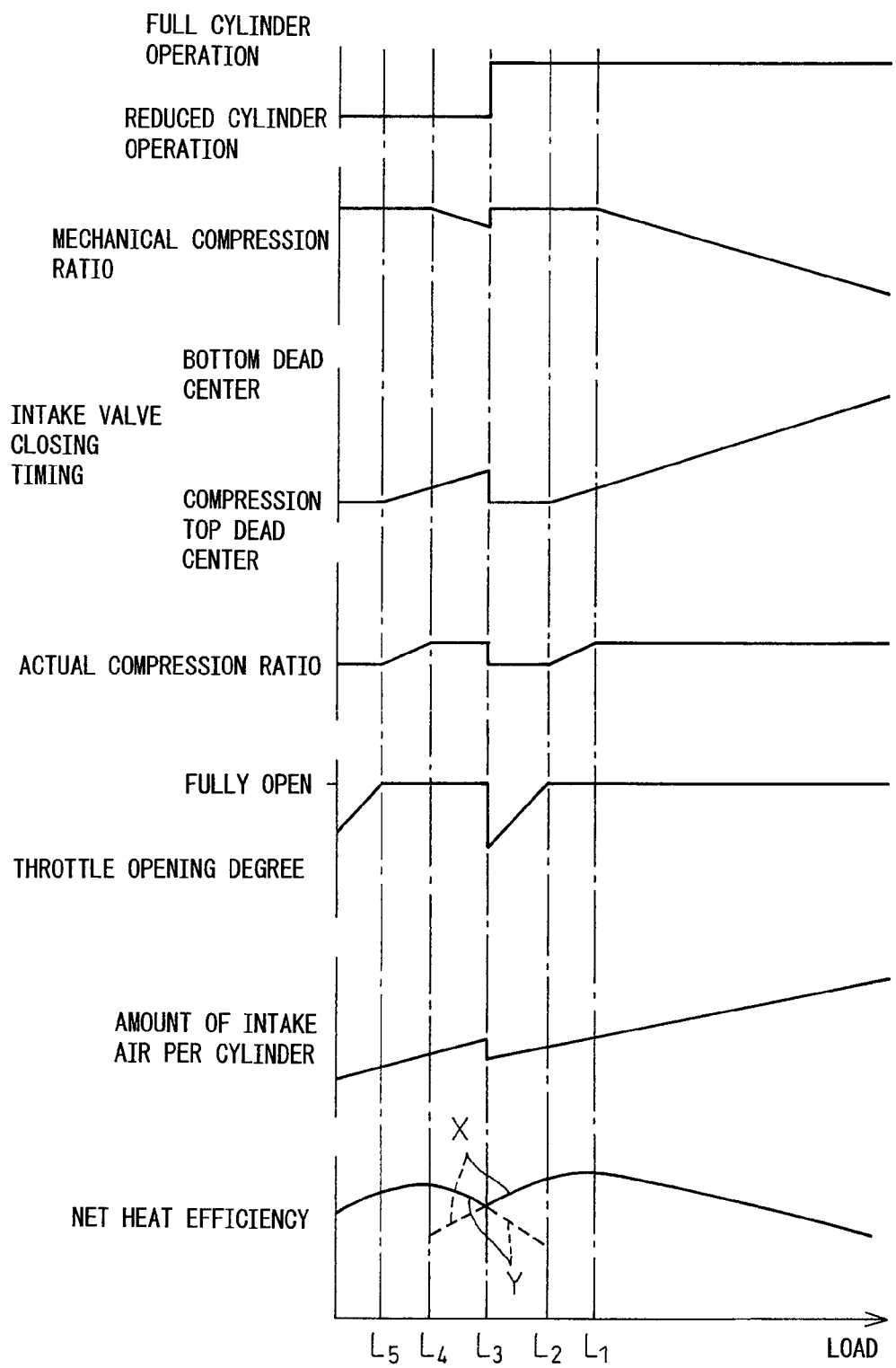
FIG. 9 is a view showing changes in the mechanical compression ratio etc. according to the engine load.
Figure 10:
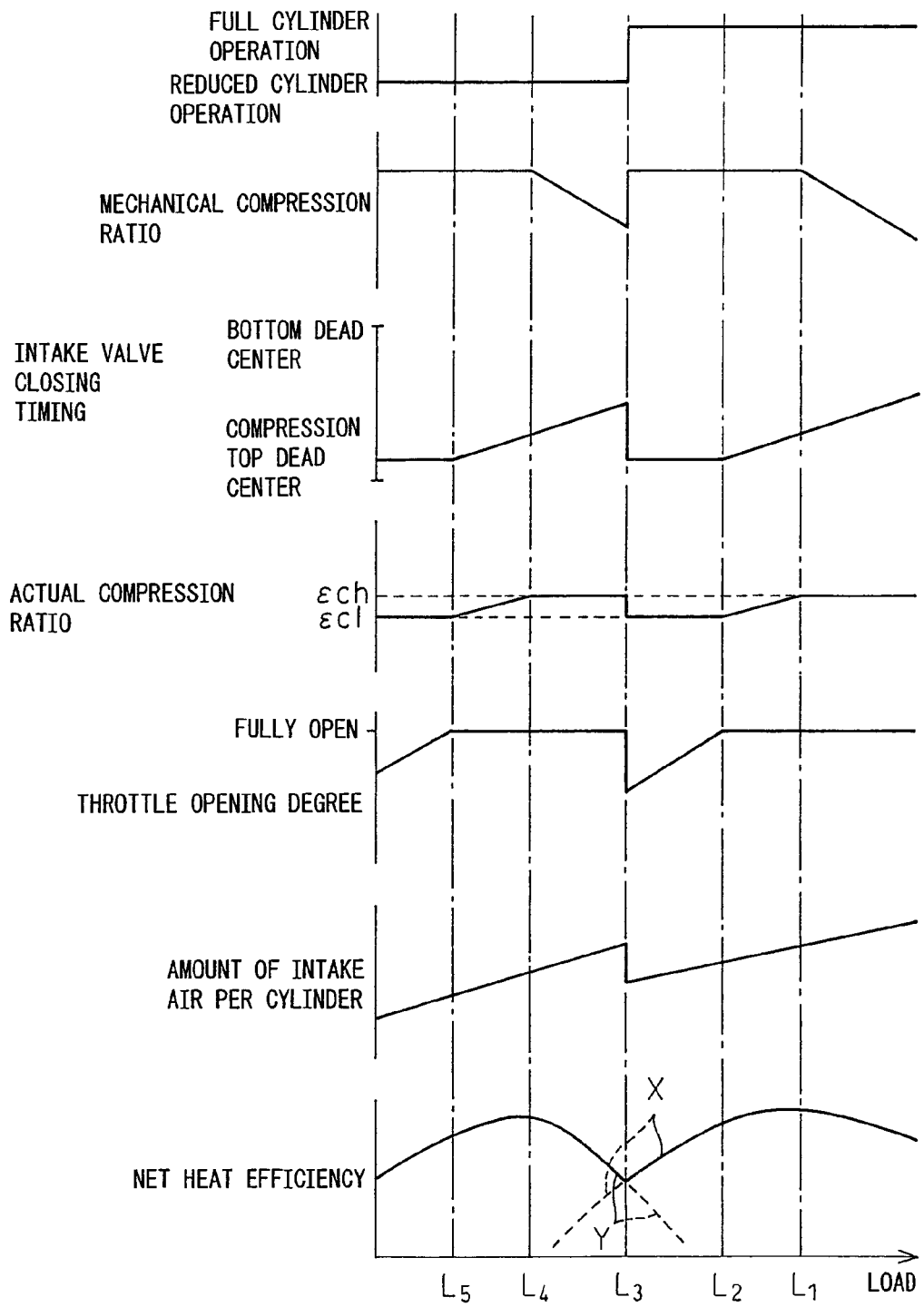
FIG. 10 is an enlarged view of the low load region of FIG. 9.

FIG. 9 and FIG. 10 show operation switching states and changes in the mechanical compression ratio, the closing timing of the intake valve 7, the actual compression ratio, the opening degree of the throttle valve 17, the amount of intake air per cylinder, and the net heat efficiency, in accordance with the engine load at a certain engine speed. FIG. 10 shows the changes in region where the engine load is low in the entire load region of FIG. 9. Note that, the solid line and broken line X in the figures show the net heat efficiency in the case of full cylinder operation, while the solid line and broken line Y in the figures show the net heat efficiency in the case of reduced cylinder operation. Further, in the illustrated example, the average air fuel ratio in a combustion chamber 5 is feedback-controlled to the stoichiometric air-fuel ratio, based on the output signal of the air-fuel ratio sensor 21, so as to reduce the unburned hydrocarbons (unburned HC), carbon monoxide (CO), and nitrogen oxides ($NO_x$) in the exhaust gas simultaneously by the three-way catalyst in the catalytic converter 20.

As will be understood from FIG. 9 and FIG. 10, in the spark ignition type internal combustion engine of the present embodiment, when the engine load is higher than $L_3$, full cylinder operation is performed, while when the engine load is lower than $L_3$, reduced cylinder operation is performed. That is, in the spark ignition type internal combustion engine in the present embodiment, at around the engine load $L_3$, the operation of the internal combustion engine is switched between full cylinder operation and reduced cylinder operation. Therefore, below, control in accordance with the engine load will be explained divided into control when the engine load is higher than $L_3$ and full cylinder operation is being performed, control when the engine load is $L_3$ and full cylinder operation and reduced cylinder operation are being switched between, and control when the engine load is lower than $L_3$ and reduced cylinder operation is being performed.

First, the control when the engine load is higher than $L_3$ and full cylinder operation is being performed will be explained. As explained above, at the time of engine high load operation, an ordinary cycle such as shown in FIG. 8(A) is performed. Therefore, as shown in FIG. 9, at the time of engine high load operation, the mechanical compression ratio is lower and therefore the expansion ratio becomes low and the closing timing of the intake valve 7 is advanced. Further, at this time, the amount of intake air is large and, at this time, the opening degree of the throttle valve 17 is held in the fully open or the substantially fully open state. Note that, since, in this way, the opening degree of the throttle valve 17 is held in the fully open or the substantially fully open state, the pumping loss is substantially zero.

On the other hand, as shown in FIG. 9, if the engine load becomes low, along with this, the closing timing of the intake valve 7 is retarded so as to reduce the amount of intake air. Further, at this time, as shown in FIG. 9, as the engine load becomes lower, the mechanical compression ratio is increased so that the actual compression ratio is held substantially constant. Therefore, as the engine load becomes lower, the expansion ratio is also increased. Note that, at this time as well, the throttle valve 17 is held in the fully open or the substantially fully open state, therefore, the amount of intake air which is supplied to the inside of the combustion chamber 5 is controlled by the closing timing of the intake valve 7 without depending on the throttle valve 17. At this time as well, the throttle valve 17 is held in the fully open or the substantially fully open state, and therefore the pumping loss is substantially zero. Further, at this time, the actual compression ratio is held at a value $\epsilon$ch highest within the range at which knocking does not occur.

In this way, when the engine load becomes lower than the engine high load operating state, the mechanical compression ratio is increased as the amount of intake air decreases under a substantially constant actual compression ratio. That is, the volume of a combustion chamber 4 when the piston 4 reaches compression top dead center is decreased in proportion to the decrease in the amount of intake air. Therefore, the volume of a combustion chamber 4 when the piston 4 reaches compression top dead center changes in proportion to the amount of intake air. Note that, at this time, the air-fuel ratio inside a combustion chamber 5 becomes the stoichiometric air-fuel ratio, and therefore the volume of a combustion chamber 4 when the piston 4 reaches compression top dead center changes in proportion to the amount of fuel.

If the engine load becomes further lower, the mechanical compression ratio is further increased. If the engine load falls to an intermediate load $L_1$ slightly toward the low load, the mechanical compression ratio reaches the limit mechanical compression ratio corresponding to the structural limit of a combustion chamber 5. Further, in the region of a load lower than the engine load $L_1$ when the mechanical compression ratio reaches the limit mechanical compression ratio and a load higher than the engine load $L_3$, the mechanical compression ratio is held at the limit mechanical compression ratio. Therefore, in the region of a load lower than the engine load $L_1$ and a load higher than the engine load $L_3$, the mechanical compression ratio becomes the maximum and the expansion ratio also becomes the maximum. In other words, in the region of a load lower than the engine load $L_1$ and a load higher than the engine load $L_3$, the mechanical compression ratio is the maximum so that the maximum expansion ratio is obtained.

If the engine load becomes further lower than the engine load $L_1$ when the mechanical compression ratio reaches the limit mechanical compression ratio, the mechanical compression ratio is held at the limit mechanical compression ratio while the closing timing of the intake valve 7 is retarded. For this reason, as the engine load becomes lower than the engine load $L_1$ when the mechanical compression ratio reaches the limit mechanical compression ratio, the actual compression ratio falls.

Further, in the example shown in FIG. 9 and FIG. 10, as the engine load becomes lower from the engine high load operating state, the closing timing of the intake valve 7 is retarded. When the engine load falls to $L_2$ which is lower than the engine load $L_1$ when the mechanical compression ratio reaches the limit mechanical compression ratio, the closing timing of the intake valve 7 becomes the limit closing timing at which the amount of intake air which is supplied to the inside of a combustion chamber 5 can be controlled. Further, in the region of a load lower than the engine load $L_2$ when the closing timing of the intake valve 7 reaches the limit closing timing and a load higher than the engine load $L_3$, the closing timing of the intake valve 7 is held at the limit closing timing.

In this way, in the region of a load lower than the engine load $L_2$ when the closing timing of the intake valve 7 reaches the limit closing timing, the mechanical compression ratio is held at the limit mechanical compression ratio and the closing timing of the intake valve 7 is held at the limit closing timing. Therefore, in this region, the actual compression ratio is held substantially constant. That is, in the example shown in FIG. 9 and FIG. 10, in the region of a load higher than the engine load $L_1$ when the mechanical compression ratio reaches the limit mechanical compression ratio and the region of a load lower than the engine load $L_2$ and a load higher than the engine load $L_3$ when the closing timing of the intake valve 7 reaches the limit closing timing, in each region, the actual compression ratio is held substantially constant. In the region between the engine load $L_1$ and the engine load $L_2$, the actual compression ratio falls as the engine load becomes lower.

On the other hand, if the closing timing of the intake valve 7 is held at the limit closing timing, it no longer becomes possible to control the amount of intake air by the closing timing of the intake valve 7. In the example shown in FIG. 9 and FIG. 10, at this time, that is, in the region of a load lower than the engine load $L_2$ when the closing timing of the intake valve 7 reaches the limit closing timing, the amount of intake air which is supplied to the inside of a combustion chamber 5 is controlled by the throttle valve 17. However, if controlling the amount of intake air by the throttle valve 17, the pumping loss increases.

Next, the control at the time of switching between full cylinder operation and reduced cylinder operation performed when the engine load is $L_3$ will be explained. As explained above, when the engine load is slightly higher than $L_3$, the mechanical compression ratio is held at the limit mechanical compression ratio and the closing timing of the intake valve 7 is held at the limit closing timing. Further, the actual compression ratio is the compression ratio $\epsilon$cl which is lower than the actual compression ratio $\epsilon$ch at the time of engine high load operation, while the opening degree of the throttle valve 17 becomes an opening degree which is closed to a certain extent.

If the engine load falls and reaches $L_3$ from such a state and the operation of the internal combustion engine is switched from full cylinder operation to reduced cylinder operation, the number of operating cylinders is reduced, and therefore the amount of intake air per cylinder has to be increased. For this reason, the opening degree of the throttle valve 17 is increased. In particular, in the example shown in FIG. 9 and FIG. 10, the opening degree of the throttle valve 17 is changed from an opening degree closed to a certain extent to a fully open or substantially fully open state.

Further, to increase the amount of intake air per cylinder, the closing timing of the intake valve 7 is moved from the limit closing timing to the intake bottom dead center side, that is, the advanced side. Note that, the closing timing of the intake valve 7 at this time is set so that the amount of intake air which is supplied to the inside of the combustion chambers 5 of the operating cylinders becomes an amount whereby even if the number of the operating cylinders is decreased, the same extent of output or torque can be generated as before the number of the operating cylinders decreased.

By increasing the opening degree of the throttle valve 17 and advancing the closing timing of the intake valve 7 along with the switching of the operation of the internal combustion engine in this way, it is possible to make the amount of intake air which is supplied to the inside of the combustion chambers 5 a suitable amount and thereby possible to suppress the fluctuations in output or torque before and after switching of the operation of the internal combustion engine.

Further, as shown in FIG. 9 and FIG. 10, if the operation of the internal combustion engine is switched from full cylinder operation to reduced cylinder operation, the mechanical compression ratio falls. As explained above, if the operation of the internal combustion engine is switched from full cylinder operation to reduced cylinder operation, the closing timing of the intake valve 7 is advanced. At this time, if holding the mechanical compression ratio as is at the limit mechanical compression ratio, the actual compression ratio becomes higher than the highest value $\epsilon$ch in the range in which knocking does not occur and there is a possibility of knocking occurring in the operating cylinders. In the present embodiment, when the operation of the internal combustion engine is switched from full cylinder operation to reduced cylinder operation, the mechanical compression ratio is made to fall, and therefore an excessive increase of the actual compression ratio can be suppressed. In particular, in the present embodiment, in relation to the closing timing of the intake valve 7, the mechanical compression ratio is set so that the actual compression ratio becomes the highest value $\epsilon$ch in the range at which knocking does not occur.

Note that, in the above explanation, control in the case where the engine load changes from a state higher than $L_3$ to a state lower than it is shown, but when the engine load changes from a state lower than $L_3$ to a state higher than it, the opposite control is performed. That is, when the engine load changes from a state lower than $L_3$ to a state higher than it, the opening degree of the throttle valve 17 becomes smaller and the closing timing of the intake valve 7 is moved in a direction away from the intake bottom dead center, that is, the retarded side. Furthermore, the mechanical compression ratio is risen and the actual compression ratio falls.

Finally, the control when the engine load is lower than $L_3$ and reduced cylinder operation is performed will be explained. As shown in FIG. 9 and FIG. 10, if the engine load becomes lower than $L_3$, along with this, the closing timing of the intake valve 7 is retarded so as to decrease the amount of intake air which is supplied to the inside of the combustion chambers 5 of the operating cylinders. Further, at this time, as in the example shown in FIG. 9 and FIG. 10, as the engine load becomes lower, the mechanical compression ratio is increased so that the actual compression ratio is maintained substantially constant at $\epsilon$ch. Therefore, as the engine load becomes lower, the expansion ratio is also increased. Note that, at this time as well, the throttle valve 17 is held in the fully open or the substantially fully open state. Therefore, the amount of intake air which is supplied inside the combustion chambers 5 is controlled by changing the closing timing of the intake valve 7 without depending on the throttle valve 17. At this time, the throttle valve 17 is held in the fully open or the substantially fully open state, and therefore the pumping loss is substantially zero.

If the engine load becomes further lower, the mechanical compression ratio is further increased. If the engine load falls to $L_4$, the mechanical compression ratio again reaches the limit mechanical compression ratio. When the mechanical compression ratio reaches the limit mechanical compression ratio, in the region of a load lower than the engine load $L_4$ when the mechanical compression ratio reaches the limit mechanical compression ratio, the mechanical compression ratio is held at the limit mechanical compression ratio.

When the engine load becomes further lower than the engine load $L_4$ when the mechanical compression ratio reaches the limit mechanical compression ratio, the mechanical compression ratio is held at the limit mechanical compression ratio while the closing timing of the intake valve 7 is retarded. For this reason, as the engine load becomes lower than the engine load $L_4$ when the mechanical compression ratio reaches the limit mechanical compression ratio, the actual compression ratio is decreased.

Further, in the example shown in FIG. 9 and FIG. 10, as the engine load becomes lower than $L_3$, the closing timing of the intake valve 7 is further retarded. When the engine load falls to $L_5$ which is lower than the engine load $L_4$ when the mechanical compression ratio reaches the limit mechanical compression ratio, the closing timing of the intake valve 7 becomes the limit closing timing. When the closing timing of the intake valve 7 reaches the limit closing timing, in the region of a load lower than the engine load $L_5$ when the closing timing of the intake valve 7 reaches the limit closing timing, the closing timing of the intake valve 7 is held at the limit closing timing.

In this way, in the region of a load lower than the engine load $L_5$ when the closing timing of the intake valve 7 reaches the limit closing timing, the mechanical compression ratio is held at the limit mechanical compression ratio and the closing timing of the intake valve 7 is held at the limit closing timing. Therefore, in this region, the actual compression ratio is held substantially constant.

On the other hand, if the closing timing of the intake valve 7 is held at the limit closing timing, it is no longer possible to control the amount of intake air by changing the closing timing of the intake valve 7. In the example shown in FIG. 9 and FIG. 10, at this time, that is, in the region of a load lower than the engine load $L_2$ when the closing timing of the intake valve 7 reaches the limit closing timing, the amount of intake air which is supplied to the inside of the combustion chambers 5 is controlled by the throttle valve 17.

Next, the advantageous effects due to operational control shown in FIG. 9 and FIG. 10 will be explained.

First, the case when performing full cylinder operation will be explained. As shown in FIG. 9 and FIG. 10, as the load becomes lower from the load where the engine load is the highest toward $L_1$, the mechanical compression ratio is increased. On the other hand, the actual compression ratio is held substantially constant. As shown in FIG. 7, even when the actual compression ratio is held constant, the higher the expansion ratio, the higher the heat efficiency. In other words, it can be said that in the present embodiment, the expansion ratio is substantially the same as the mechanical compression ratio, and therefore even when holding the actual compression ratio constant, the higher the mechanical compression ratio, the higher the heat efficiency. As a result, as shown in FIG. 9 and FIG. 10 by the solid line X, if the engine load becomes lower than the engine high load operating state toward $L_1$, the net heat efficiency is increased.

On the other hand, in the region between the engine load $L_1$ when the mechanical compression ratio reaches the limit mechanical compression ratio and the engine load $L_2$ when the closing timing of the intake valve 7 reaches the limit closing timing, the mechanical compression ratio is held at the limit mechanical compression ratio and the actual compression ratio is decreased along with the drop in the engine load. In general, if the actual compression ratio becomes lower, the net heat efficiency also falls. Further, in this region, the closing timing of the intake valve 7 is set to the comparatively retarded side, but if, in this way, the closing timing of the intake valve 7 is set to the retarded side, the amount of intake gas which once flows into a combustion chamber 5, receives heat from the wall surface of the combustion chamber 5 to be raised in temperature, then is blown back from the combustion chamber 5 to the inside of the intake port 8, becomes greater. Due to this, the temperature of the intake gas which is finally supplied to the inside of a combustion chamber 5 becomes higher. Due to this as well, the net heat efficiency falls. For this reason, in this region, as shown by the solid line X in FIG. 9 and FIG. 10, the net heat efficiency falls along with the drop in the engine load.

Furthermore, in the region of a load lower than the engine load $L_2$ when the closing timing of the intake valve 7 reaches the limit closing timing, the mechanical compression ratio is held at the limit mechanical compression ratio and the actual compression ratio is held substantially constant at ∈cl. Furthermore, along with the drop in the engine load, the opening degree of the throttle valve 17 is made smaller. As explained above, if the opening degree of the throttle valve 17 becomes smaller, pumping loss occurs and as a result the net heat efficiency falls. Therefore, in this region, the net head efficiency falls along with the drop in the engine load. In particular, as shown by the broken line X in FIG. 9 and FIG. 10, when continuing full cylinder operation even in the region of a load lower than the engine load $L_3$, the net heat efficiency continues to fall along with the drop in the engine load.

As a result, it is learned that when performing full cylinder operation, the net heat efficiency peaks when the engine load becomes $L_1$ and that as the engine load separates away from $L_1$, the net heat efficiency falls.

On the other hand, when performing reduced cylinder operation, as shown in FIG. 9 and FIG. 10, as the engine load rises from the lowest load toward $L_5$, the opening degree of the throttle valve 17 is increases. On the other hand, the mechanical compression ratio and the actual compression ratio are held substantially constant. For this reason, as the engine load becomes higher, the pumping loss falls. Accordingly, as shown by the solid line Y in FIG. 9 and FIG. 10, the net heat efficiency becomes higher.

Further, in the region between the engine load $L_5$ when the closing timing of the intake valve 7 reaches the limit closing timing and the engine load $L_4$ when the mechanical compression ratio reaches the limit mechanical compression ratio, the mechanical compression ratio is held at the limit mechanical compression ratio and the actual compression ratio is increased along with the engine load becoming higher. For this reason, in this region, as shown by the solid line Y in FIG. 9 and FIG. 10, the net heat efficiency is increased as the engine load becomes higher. Further, in this region, along with the engine load becoming higher, the closing timing of the intake valve 7 is advanced. As a result, the amount of intake gas which once flows into a combustion chamber 5, then is blown back to the inside of the intake port 8 is decreased. Due to this as well, the net heat efficiency is increased as the engine load becomes higher.

On the other hand, in the region of a load higher than the engine load $L_4$ when the mechanical compression ratio reaches the limit mechanical compression ratio, the mechanical compression ratio falls along with a rise in the engine load. On the other hand, the actual compression ratio is held substantially constant. Therefore, in this region, the net heat efficiency falls as the engine load rises. In particular, as shown by the broken line Y in FIG. 9 and FIG. 10, when continuing reduced cylinder operation even in the region of a load higher than the engine load $L_3$, the net heat efficiency continues to fall along with a rise in the engine load.

From the above, it will be understood that when performing reduced cylinder operation, when the engine load is $L_4$, the net heat efficiency peaks and that as the engine load separates away from $L_4$, the net heat efficiency falls.

As will be understood from FIG. 9 and FIG. 10, in the region of a load higher than the engine load $L_3$, the net heat efficiency is higher when performing full cylinder operation than when performing reduced cylinder operation. On the other hand, in the region of a load lower than the engine load $L_3$, the net heat efficiency is higher when performing reduced cylinder operation than when performing full cylinder operation. In the present embodiment, as explained above, full cylinder operation is performed in the region of a load higher than the engine load $L_3$, while reduced cylinder operation is performed in a region of a load lower than the engine load $L_3$, and therefore the net heat efficiency can be constantly high over the entire operating region. In other words, according to the present embodiment, even in the engine low load operating region where the net heat efficiency could not be raised when performing full cylinder operation, it is possible to raise the net heat efficiency by performing reduced cylinder operation.

Note that, in the above embodiment, full cylinder operation and reduced cylinder operation are switched when the engine load is the load $L_3$ where the net heat efficiency when performing full cylinder operation and the net heat efficiency when performing reduced cylinder operation become equal. However, the full cylinder operation and the reduced cylinder operation do not necessarily have to be switched at the engine load $L_3$. They need only be switched at not more than the load $L_1$ where the net heat efficiency becomes the maximum at the time of full cylinder operation and not less than the load $L_4$ where the net heat efficiency becomes the maximum at the time of reduced cylinder operation. Alternatively, full cylinder operation and reduced cylinder operation may be switched at not more than the engine load at which the mechanical compression ratio becomes the limit mechanical compression ratio or the engine load where the closing timing of the intake valve 7 becomes the limit closing timing during full cylinder operation or not less than the engine load where the mechanical compression ratio becomes the limit mechanical compression ratio or the engine load where the closing timing of the intake valve 7 becomes the limit closing timing during reduced cylinder operation.

Further, in general, when performing full cylinder operation, the engine load $L_1$ where the net heat efficiency becomes the maximum is about ½ of the maximum engine load. As explained above, full cylinder operation and reduced cylinder operation are switched at the load $L_1$ or less where the net heat efficiency at the time of full cylinder operation becomes maximum, and therefore can be said to be switched at ½ or less of the maximum engine load.

Furthermore, in the above embodiment, when shifting from full cylinder operation to reduced cylinder operation, that is, when idling part of the plurality of cylinders, or when shifting from reduced cylinder operation to full cylinder operation, that is, when operating all of the previously idled cylinders, the mechanical compression ratio etc. are controlled. Similar control, that is, control of the mechanical compression ratio etc. when shifting from full cylinder operation to reduced cylinder operation and control of the mechanical compression ratio etc. when shifting from reduced cylinder operation to full cylinder operation, may be applied when increasing the idled cylinders, for example, when increasing the number of idled cylinders from two cylinders to four cylinders, and when decreasing the idled cylinders, for example, when decreasing the number of idled cylinders from four cylinders to two cylinders.

Note that, in the above example, the engine loads $L_1$ and $L_4$ when the mechanical compression ratio reaches the limit mechanical compression ratio are respectively higher than the engine loads $L_2$ and $L_5$ when the closing timing of the intake valve 7 reaches the limit closing timing. However, depending on the configuration of the variable compression ratio mechanism A or the variable valve timing mechanism B, the engine loads $L_1$ and $L_4$ when the mechanical compression ratio reaches the limit mechanical compression ratio may sometimes become lower than the engine loads $L_2$ and $L_5$ when the closing timing of the intake valve 7 reaches the limit closing timing. In this case, in the region between the engine load $L_2$ when the closing timing of the intake valve 7 reaches the limit closing timing and the engine load $L_1$ when the mechanical compression ratio reaches the limit mechanical compression ratio and the region between the engine load $L_5$ when the closing timing of the intake valve 7 reaches the limit closing timing and the engine load $L_4$ when the mechanical compression ratio reaches the limit mechanical compression ratio, the closing timing of the intake valve 7 is held at the limit closing timing and the mechanical compression ratio is also held substantially constant. For this reason, in these regions, the actual compression ratio is held substantially constant.

Further, if the engine speed becomes high, the air-fuel mixture in the combustion chamber 5 becomes disturbed, and thus knocking becomes harder to occur. Therefore, in this embodiment according to the present invention, the higher the engine speed, the higher the actual compression ratio.

Furthermore, as explained above, in the superhigh expansion ratio cycle shown in FIG. 8(B), the expansion ratio is made 26. The higher the expansion ratio, the better, but as will be understood from FIG. 7, even with respect to the actually usable lower limit actual compression ratio $\epsilon=5$, if 20 or more, a considerably high theoretical heat efficiency can be obtained. Therefore, in the present invention, the variable compression ratio mechanism A is formed so that the expansion ratio becomes 20 or more.

Further, in the example shown by the broken line in FIG. 9, the mechanical compression ratio is continuously changed in accordance with the engine load. However, the mechanical compression ratio can also be changed in stages in accordance with the engine load.

Figure 11:
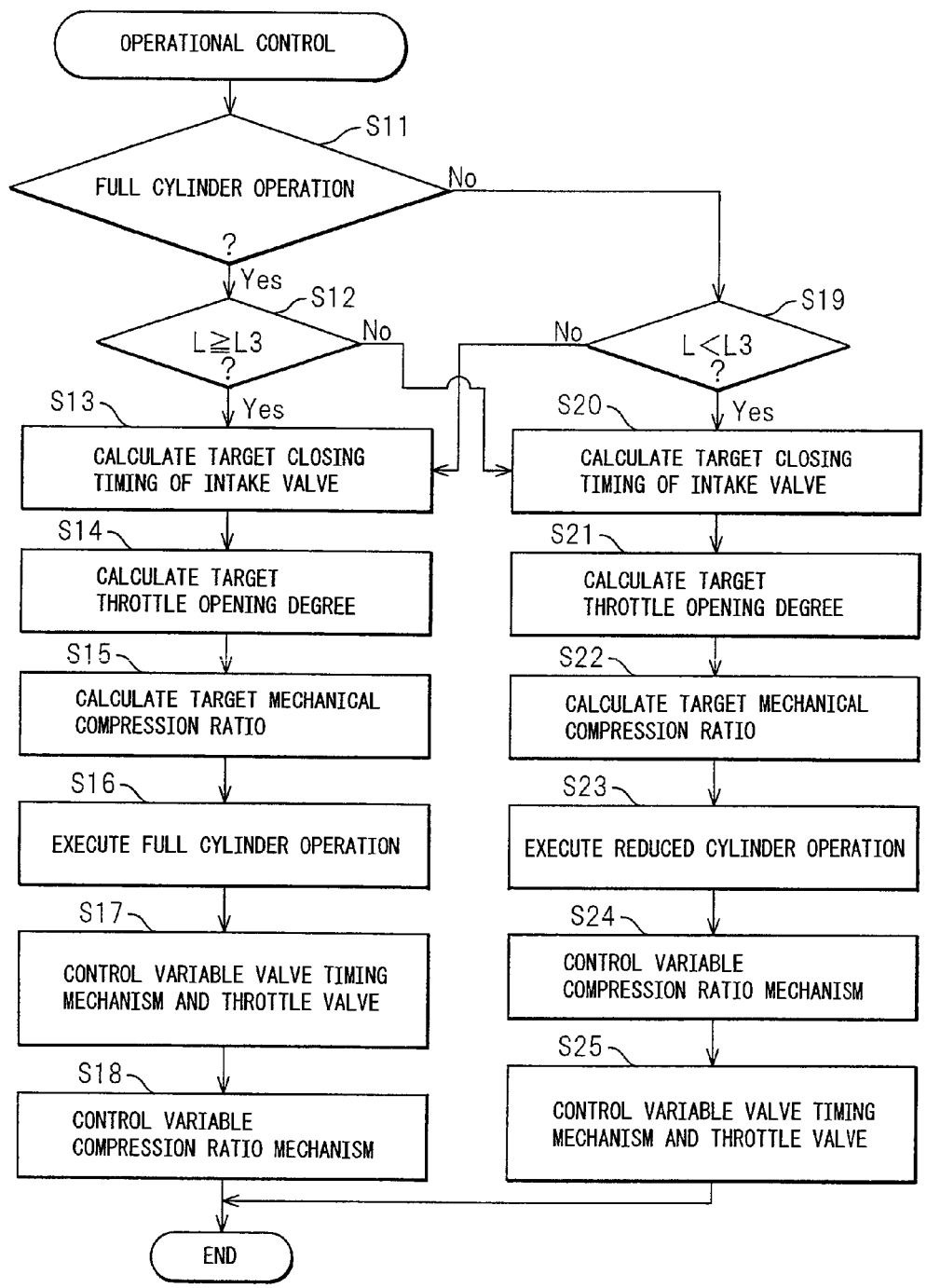
FIG. 11 is a flowchart showing the control routine of the operation control for the spark ignition type internal combustion engine according to the embodiment.

FIG. 11 is a flow chart which shows a control routine for operational control of a spark ignition type internal combustion engine in the present embodiment. As shown in FIG. 11, first, at step S11, it is judged if full cylinder operation is in progress. When, at step S11, it is judged that full cylinder operation is in progress, the routine proceeds to step S12. At step S12, it is judged if the engine load L which was detected by the load sensor 41 is $L_3$ or more. When it is judged that the engine load L is $L_3$ or more, the routine proceeds to step S13. At step S13 to S18, control for execution of full cylinder operation is performed as is (details explained later).

On the other hand, when, at step S12, it is judged that the engine load L which was detected by the load sensor 41 is lower than $L_3$, the routine proceeds to step S20. At step S20 to S25, the operation of the internal combustion engine is switched from full cylinder operation to reduced cylinder operation. At step S20, the target closing timing of the intake valve 7 is calculated from the engine load L and the engine speed calculated based on the crank angle sensor 42 by using the map or calculation formula for reduced cylinder operation. In particular, the target closing timing of the intake valve 7 is set so that the amount of intake air per operating cylinder becomes a suitable amount of intake air. As will be understood from FIG. 9 and FIG. 10, at this time, the calculated target closing timing of the intake valve 7 is a timing at the advanced side from the closing timing up to then.

Next, at step S21, the target opening degree of the throttle valve 17 is calculated from the engine load L and the engine speed by using the map or calculation formula for reduced cylinder operation. As will be understood from FIG. 9 and FIG. 10, at this time, the calculated target opening degree of the throttle valve 17 is larger than the opening degree of the throttle valve 17 up to then, for example, is fully open. Next, at step S22, the target mechanical compression ratio is calculated from the engine load L and the engine speed by using the map or calculation formula for reduced cylinder operation. In particular, the target mechanical compression ratio is set in relation to the target closing timing of the intake valve 7 so that the actual compression ratio of the operating cylinders becomes a suitable actual compression ratio. As will be understood from FIG. 9 and FIG. 10, at this time, the calculated target mechanical compression ratio is lower than the mechanical compression ratio up to then.

At step S23, reduced cylinder operation is executed and injection of fuel from the fuel injectors 13 is suspended for part of the cylinders. Next, at step S24, the variable compression ratio mechanism A is controlled so that the mechanical compression ratio becomes the target mechanical compression ratio which was calculated at step S22. Next, at step S25, the variable valve timing mechanism B is controlled so that the closing timing of the intake valve 7 becomes the target closing timing which was calculated at step S20, the throttle valve 17 is controlled so that the opening degree of the throttle valve 17 becomes the target opening degree which was calculated at step S21, and the control routine is made to end.

As will be understood from the relationship of step S24 and step S25, in the present embodiment, when full cylinder operation is switched to reduced cylinder operation, the operation by the variable compression ratio mechanism A for change of the mechanical compression ratio is started before the operation by the variable valve timing mechanism B for changing the closing timing of the intake valve 7 and the operation by the throttle valve 17 for changing the opening degree. This is because the operation for change by the variable compression ratio mechanism A takes more time than the operation for change by the variable valve timing mechanism B or the throttle valve 17 and because if the variable valve timing mechanism B or the throttle valve 17 operates first, the amount of intake air will become larger, yet the mechanical compression ratio will still remain in a high state and therefore knocking will be invited.

On the other hand, when it is judged at step S11 that reduced cylinder operation is in progress, the routine proceeds to step S19. At step S19, it is judged if the engine load L which was detected by the load sensor 41 is lower than $L_3$. When it is judged that the engine load L is lower than $L_3$, the routine proceeds to step S20. At steps S20 to S25, reduced cylinder operation control is performed as it is.

On the other hand, when, at step S19, it is judged that the engine load L which was detected by the load sensor 41 is $L_3$ or more, the routine proceeds to step S13. At step S13 to S18, the operation of the internal combustion engine is switched from reduced cylinder operation to full cylinder operation. Note that, step S13 to step S15 are similar to steps S20 to S22, and thus explanations are omitted.

At step S16, full cylinder operation is performed and fuel is injected into all of the cylinders from the fuel injectors 13. Next, at step S17, the variable valve timing mechanism B is controlled so that the closing timing of the intake valve 7 becomes the target closing timing which was calculated at step S13 and the throttle valve 17 is controlled so that the opening degree of the throttle valve 17 becomes the target opening degree which was calculated at step S14. Next, at step S18, the variable compression ratio mechanism A is controlled so that the mechanical compression ratio becomes the target mechanical compression ratio which was calculated at step S22 and the control routine is ended.

As will be understood from the relationship of step S17 and step S18, in the present embodiment, when switching from reduced cylinder operation to full cylinder operation, the operation of the variable valve timing mechanism B for changing the closing timing of the intake valve 7 and the operation of the throttle valve 17 for changing the opening degree are started before the operation of the variable compression ratio mechanism A for changing the mechanical compression ratio. This is because if the variable compression ratio mechanism A operates first, while the amount of intake air is not decreased, the mechanical compression ratio becomes higher and therefore knocking is invited.

Note that, in the above example, the engine load for switching from full cylinder operation to reduced cylinder operation and the engine load for switching from reduced cylinder operation to full cylinder operation are both the same $L_3$, but it is also possible to make the engine load for switching from full cylinder operation to reduced cylinder operation lower than the load for switching from reduced cylinder operation to full cylinder operation so as to impart hysteresis.

Note that, the present invention was explained in detail based on specific embodiments, but a person skilled in the art could make various changes, corrections, etc. without departing from the claims and concept of the present invention.

REFERENCE SIGNS LIST

1 . . . crank case
2 . . . cylinder block
3 . . . cylinder head
4 . . . piston
5 . . . combustion chamber
7 . . . intake valve
8 . . . intake port
13 . . . fuel injector
17 . . . throttle valve
30 . . . electronic control unit
A . . . variable compression ratio mechanism
B . . . variable valve timing mechanism

The invention claimed is:

1. A spark ignition type internal combustion engine including a plurality of cylinders and being able to stop combustion in part of these cylinders, the spark ignition type internal combustion engine comprising, a variable compression ratio mechanism which can change a mechanical compression ratio and a variable valve timing mechanism which can control a closing timing of an intake valve, wherein when idling part of the cylinders or increasing idled cylinders, the closing timing of the intake valve moves in a direction which approaches an intake bottom dead center side, and the mechanical compression ratio of the operating cylinders falls.

2. A spark ignition type internal combustion engine as set forth in claim 1, wherein when idling said part of the cylinders or increasing idled cylinders, an opening degree of a throttle valve is increased.

3. A spark ignition type internal combustion engine as set forth in claim 1, wherein when idling said part of the cylinders or increasing idled cylinders, an actual compression ratio of the operating cylinders becomes larger.

4. A spark ignition type internal combustion engine as set forth in claim 1, wherein when idling said part of the cylinders or increasing idled cylinders, an operation by the variable compression ratio mechanism to reduce a mechanical compression ratio of the operating cylinders is started, then a shift by the variable valve timing mechanism of the closing timing of the intake valve is started.

5. A spark ignition type internal combustion engine as set forth in claim 1, wherein said spark ignition type internal combustion engine performs reduced cylinder operation which idles part of the cylinders when the engine load is lower than a switching load and performs full cylinder operation which operates all cylinders when the engine load is the switching load or more, and wherein when the engine load is lower than the switching load, as the engine load falls toward a predetermined load which is lower than the switching load, the mechanical compression ratio is increased and the actual compression ratio is held constant.

6. A spark ignition type internal combustion engine as set forth in claim 5, wherein said predetermined load is an engine load when the mechanical compression ratio is increased along with a drop in the engine load from the switching load and as a result the mechanical compression ratio reaches a maximum mechanical compression ratio.

7. A spark ignition type internal combustion engine as set forth in claim 5, wherein said switching load is a load of half or less of the maximum engine load.

8. A spark ignition type internal combustion engine as set forth in claim 5, wherein said switching load is not more than the load where a heat efficiency becomes maximum when performing full cylinder operation and not less than a load where the heat efficiency becomes maximum when performing reduced cylinder operation.

9. A spark ignition type internal combustion engine as set forth in claim 5, wherein said switching load is a load when the heat efficiency when performing reduced cylinder operation and the heat efficiency when performing full cylinder operation become equal.

* * * * *